US005775447A

United States Patent [19]
Dester et al.

[11] Patent Number: 5,775,447
[45] Date of Patent: Jul. 7, 1998

[54] MATERIAL DEFLECTING ASSEMBLY FOR A TRACK ASSEMBLY

[75] Inventors: Delbert D. Dester, Washington; Dave E. Keedy, Pekin, both of Ill.

[73] Assignee: Caterpillar Inc., Peoria, Ill.

[21] Appl. No.: 719,378

[22] Filed: Sep. 25, 1996

[51] Int. Cl.⁶ .................................................. B62D 55/088
[52] U.S. Cl. ............................ 180/9.1; 305/110; 280/856
[58] Field of Search .......................... 180/9.1, 9.5, 9.52, 180/9.54; 280/855, 856; 305/100, 107, 109, 110; 172/112, 610

[56] References Cited

U.S. PATENT DOCUMENTS

| | | | |
|---|---|---|---|
| 1,741,878 | 12/1929 | Rasmussen | 305/109 |
| 1,835,273 | 12/1931 | Byson | 280/856 |
| 2,560,307 | 7/1951 | Slemmons | 305/110 |
| 3,509,807 | 5/1970 | Carlton | 280/855 |
| 3,713,661 | 1/1973 | Luthman et al. | 305/109 |
| 3,963,278 | 6/1976 | Van Wuytswinkel | 305/109 |
| 4,531,787 | 7/1985 | Hart et al. | 305/109 |
| 4,957,180 | 9/1990 | Lammers et al. | 180/69.1 |
| 5,697,683 | 12/1997 | Arulandu et al. | 305/110 |

FOREIGN PATENT DOCUMENTS

| | | | |
|---|---|---|---|
| 135033 | 11/1949 | Australia | 280/855 |
| 328208 | 4/1930 | United Kingdom | 280/855 |

*Primary Examiner*—Kevin Hurley
*Attorney, Agent, or Firm*—William C. Perry

[57] ABSTRACT

During the operation of a track-type machine in abrasive terrain, it is common to have foreign material deposited between the engagement surfaces of a track chain assembly. The presence of this foreign material between these surfaces has been known to greatly accelerate the wear between these components. The present invention provides a pair of deflecting plates that are positioned adjacent and in overlying relation to certain engagement surfaces of various components of the track chain assembly 14. The deflecting plates direct foreign material away from contact with the engagement surfaces and thereby reduce the wear of the track chain components.

15 Claims, 2 Drawing Sheets

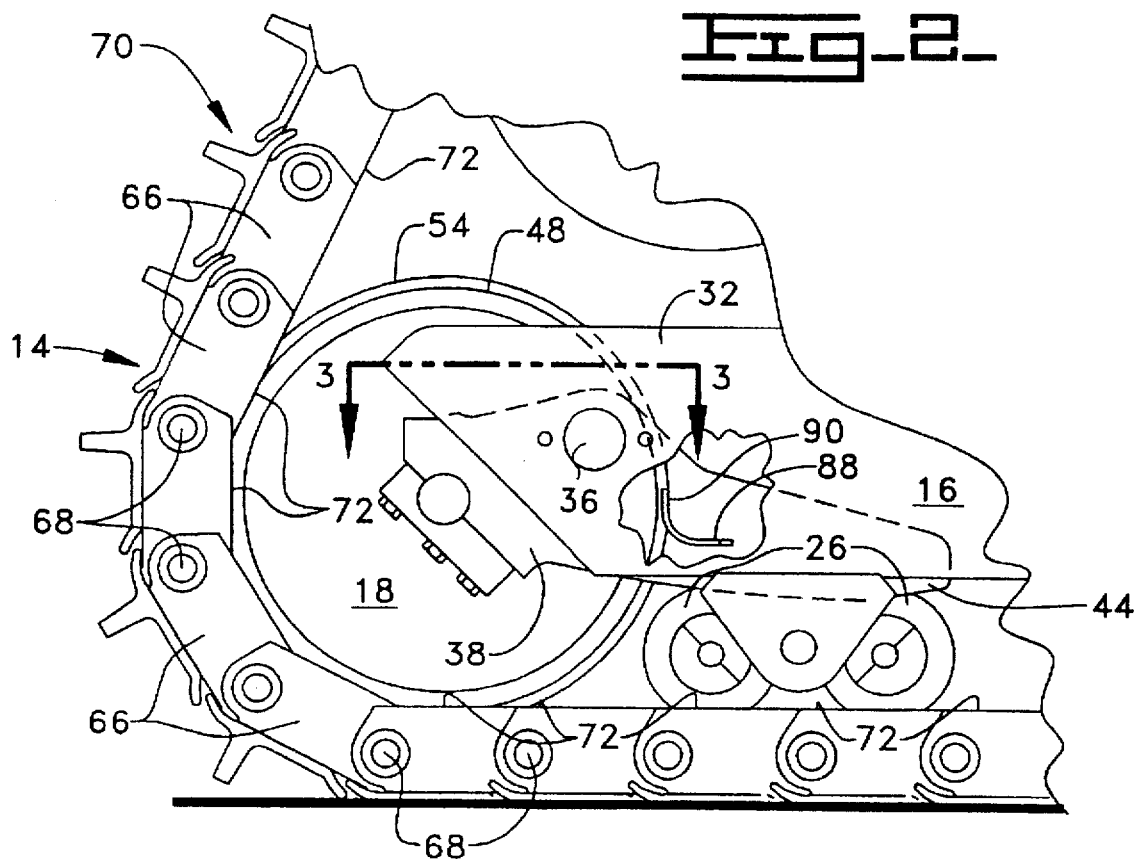
Fig_2_
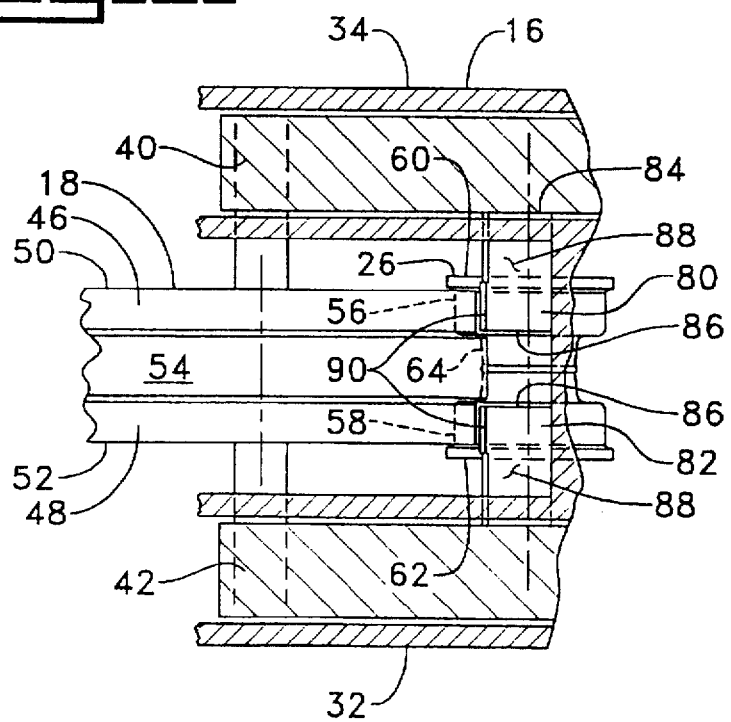
Fig_3_

5,775,447

MATERIAL DEFLECTING ASSEMBLY FOR A TRACK ASSEMBLY

TECHNICAL FIELD

This invention relates to a mechanism to reduce wear in the components of a track chain and more particularly to an assembly that deflects material away from the selective components of a track chain to prevent the accelerated wear of those components.

BACKGROUND ART

In the operation of construction machines, especially track-type tractors, it is very common to operate in a variety of soil conditions. During operation of a track assembly, the movement of the track along the ground will cause the track to pick up the soil as it makes contact with the ground only to have the material fall or be jarred therefrom as the track segments are elevated from contact with the ground. Many times this occurs directly over the track roller frame and the underlying track components. When this occurs, the material is likely to fall on the various wear surfaces of the track components that contact the track links. These wear surfaces include the engagement surfaces of the track rollers and idlers that contact the wear rails of the individual track links. The presence of this material between these areas of contact greatly accelerates the wear of these two components. This is especially true when the environment in which the track is being operated is sand or tar sand or other highly abrasive material. With the increase in wear, the expense and maintenance of the track components is also greatly increased while the production time of the machine, is greatly decreased.

The present invention is directed to overcoming one or more of the problems as set forth above.

DISCLOSURE OF THE INVENTION

In one aspect of the present invention a material deflector assembly is provided for a track assembly. A frame is included that has a first end portion that defines a pair of bifurcated arm members. An idler member having a pair of engagement surfaces is defined thereon in spaced relationship to one another is mounted to the frame between the bifurcated arm members. A roller member having a pair of engagement surfaces defined thereon in spaced relationship to one another, is mounted to the frame with the engagement surfaces thereof aligned with the engagement surfaces of the idler member. A pair of deflecting plates is provided, each of which has a first portion and a second portion positioned at an upwardly extending angle from the first portion. Each of the deflecting plates is secured to an opposing one of the bifurcated arms in overlying relationship to the track roller with the second portion thereof adjacent engagement surfaces of the idler member.

In another aspect of the present invention a material deflector assembly for a track assembly is provided that includes a frame that is adapted to support the track assembly. The frame has a first end portion that defines a pair of bifurcated arms. An idler member having a pair of spaced-apart engagement surfaces defined on opposing end portions thereof is adapted for engagement with the track assembly and is rotatably mounted to the frame between the bifurcated arms. A roller member having a pair of spaced-apart engagement surfaces defined on opposing end portions thereof is adapted for engagement with the track assembly. The roller member is rotatably mounted to the frame at a location that is subjacent and generally centrally positioned between and the bifurcated arm members. A pair of deflecting plates having a first, substantially planar portion and a second, upwardly extending portion is included. Each one of the deflecting plates is secured to opposing ones of the bifurcated arms in substantially overlying relationship to the engagement surfaces defined by the roller member. Likewise, the upwardly extending portion of each of the deflecting plates is positioned adjacent the idler member.

BRIEF DESCRIPTION OF THE DRAWINGS

FIG. 2 is diagrammatic enlargement of a portion of the machine shown in FIG. 1 that is encompassed within the portion indicated by the numeral 2; and FIG. 3 is a diagrammatic view taken along lines 3—3 of FIG. 2.

BEST MODE FOR CARRYING OUT THE INVENTION

Figure 1:
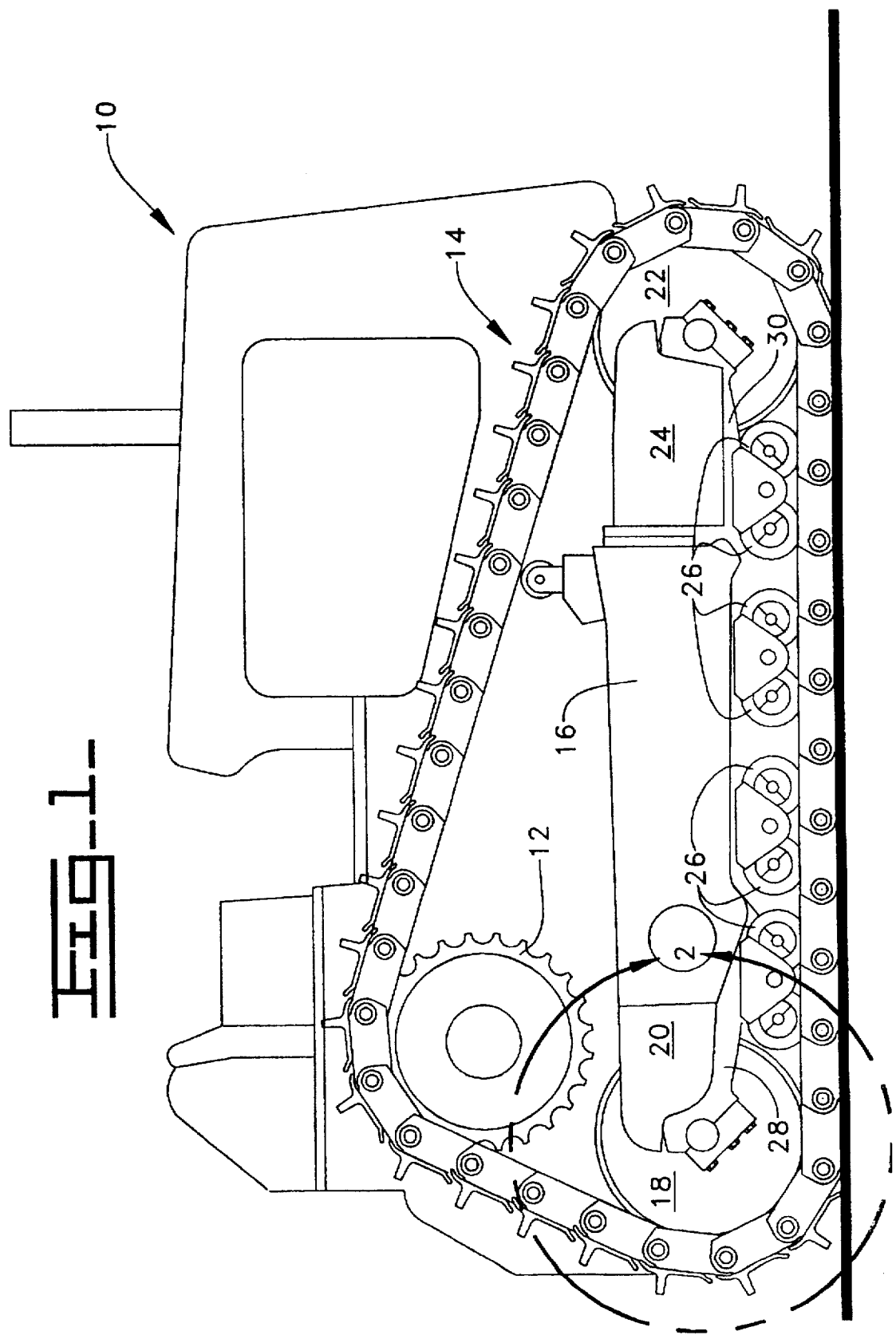
FIG. 1 is a diagrammatic side view of a track type machine that embodies the principles of the present invention.

Referring now to the drawings, in particular to FIG. 1, it can be seen that a construction machine 10 is shown. The illustrated machine is a track-type tractor that utilizes power from a conventional drive train (not shown) to drive a sprocket 12 in a well known manner. The sprocket in turn, is engaged with a track chain assembly 14 of conventional construction to provide motive traction between the ground and the machine to propel the machine over the terrain. The track chain assembly 14 is supported by a track roller frame 16 that mounts a first idler 18 on a first or rear portion 20 of the track roller frame and a second idler 22 on a second or front portion 24 of the track roller frame 16. A plurality of track rollers 26 are mounted along a portion of the track frame and are positioned between the idlers 18 and 22. The track chain assembly 14 is entrained about and supported by the sprocket 12, the first and second idlers 18 and 22 and track rollers 26. When rotated by the sprocket, the track chain assembly rotates about these components in rolling contact therewith, when the machine is moved in either direction.

Each idler 18 and 22 is rotatably mounted to a bogie arm 28 and 30 respectively. Each bogie arm is pivotally mounted to the respective first and second end portions 20 and 24 of the track roller frame 16. The construction and mounting of each bogie arm 28 and 30 is essentially identical although they are positioned so as to be a mirror image of one another. Because the idlers and their associated mountings are essentially identical, only one will be described and shown in detail. It is to be understood however that the same reference numerals will apply to identical components on each idler and associated mounting apparatus.

Turning now to FIGS. 2 and 3, it can be seen that the track roller frame 16 defines a pair of bifurcated arms 32 and 34. The first bogie arm 28 is pivotally mounted between the bifurcated arms defined by the track roller frame by a pivot joint shown at 36. The bogie arm 28 defines a first end portion 38 that also defines a pair of bifurcated arms 40 and 42. The arms 40 and 42 are spaced apart a distance sufficient to receive the first idler 18 which is rotatably mounted therebetween. The bogie arm 28 also defines a second end portion 44 (FIG. 1) that extends away from the idler 18 and rotatably mounts one of the track rollers 26 thereon. The track roller is pivotally mounted to the second end of the bogie arm so it will extend beneath the second end portion 44 and will be able to pivot with respect thereto.

The idler 18 defines a pair of engagement surfaces 46 and 48 that are spaced apart from one another on opposite end portions 50 and 52 respectively. The engagement surfaces are space apart a preselected distance that is determined by an upraised portion 54 that is defined on a central portion of the idler.

The roller 26 also defines a pair of engagement surfaces 56 and 58 on opposite end portions 60 and 62 thereof. The engagement surfaces 56 and 58 are spaced apart a preselected distance that is equal to the spacing of the engagement surfaces 46 and 48 defined by the idler 18. A cylindrical portion 64 joins the two engagement surfaces 56 and 58 and has a diameter that is reduced from that of the engagement surfaces 56 and 58. The cylindrical portion 64 defines a relieved portion that is centrally disposed between each of the engagement surfaces 56 and 58. As can be seen in FIGS. 2 and 3, the engagement surfaces 56 and 58 of the roller 26 are substantially aligned with the engagement surfaces 46 and 48 defined by the idler 18. While the pivotal mountings between the idler and the roller are spaced from each other along the bogie arm 28, the respective engagement surfaces are substantially aligned with one another. Because of the differences in the diameters of the idler and the roller, it can be seen in FIG. 3 that the respective components are substantially vertically aligned along a forward extremity of the idler.

The track chain assembly 14 is comprised of a plurality of link members 66 that are pinned together by a plurality of track pins 68 to form a pair of continuous chains 70 (one shown) that are secured in spaced, parallel relation to one another. Each link 66 defines a wear rail 72 on a inner portion thereof. The wear rails 72 of the two continuous chains 70 are spaced apart a distance that is substantially equal to that of the spacing between the respective engagement surfaces of both the idler and the roller. The track chain assembly 70 is entrained about both idlers 18 and 22 with the upraised center portion 54 positioned between the two chain assemblies to serve as a guide member for the track chain. The track chain assembly 70 lies beneath the rollers 26 to support the machine. The upper portion of the track chain assembly, as viewed in FIG. 1, is drivingly engaged with the sprocket 12 which will cause the track chain assembly to move with respect to the track roller frame 16 and the associated components as previously described.

A pair of deflecting plates 80 and 82 are mounted to the opposing arms 40 and 42 respectively, defined by the first end portion 38 of the first bogie arm 28. Each deflecting plate is essentially identical and defines a first side portion 84 that is secured to the respective arms 40 and 42 of the bogie arm. The deflecting plates extend laterally towards each other from the arms 40 and 42, passing beneath the track roller frame arms 32 and 34 and terminate at a second side portion 86 that is positioned over the relieved portion 64 defined by the roller 26. A first end portion 88 of each deflecting plate is substantially planer and has a preselected width that is at least the same as the engagement surfaces 56 and 58 of the rollers 26 over which it is positioned. A second end portion 90 of each deflecting plate is curved upwardly from the first portion 88 and terminates adjacent each of the engagement surfaces 46 and 48 of the first idler 18. In the illustrated embodiment, the first end portion 88 is positioned at substantially a 90 degree angle with respect to the second end portion 90. The height of the second end portion 90 is optimally approximately 66% of the width, or distance between the first and second side portions 84 and 86. It is to be understood that the ratio of the height of the second portion to the width of the first portion could fall within a range of approximately 60% to 70% without departing from the intent of the invention.

While this invention is described and shown for use on a track type machine having a suspended undercarriage that utilizes the bogie arms 28 and 30 mounted at the fore and aft ends of the track roller frame 16, it is to be understood that the invention could be adapted to function just as well on a machine having a non-suspended undercarriage. It is within the scope of this invention that the deflecting plates 80 and 82 could be connected directly to the bifurcated arms 32 that define the end portions 20 and 24 of the track roller frame. Being so positioned, each deflecting plate would overlie the rollers and would be positioned adjacent the idler to function in a manner identical to the embodiment described above.

INDUSTRIAL APPLICABILITY

The operation of a track-type machine 10, as described above, often takes place in terrain that is exceptionally gritty and abrasive. When this occurs, the material is often picked up by the track chain assembly 14 when it contacts the ground and is carried with it as it rotates with the idlers 18 and 22. With respect to the rear idler 18, for example, the material is often left on the engagement surfaces 46 and 48 or falls on these surfaces as the track links 66 are moved toward the sprocket 12. As the idler 18 rotates in a clockwise direction, as shown in the instant example, the material that is carried by the idler 18 will tend to fall off on the opposite side of the idler (downward moving side). As the material falls from the idler, it will fall on the first portion 88 of the respective deflecting plates 80 and 82. If the material is more adhesive in nature, having a tendency to stick to the idler, the second portion 90 of the deflective plates, being positioned closely adjacent the idler, will act as a scraper and remove the material from the engagement surfaces 46 and 48 of the idler. This material will also fall upon the first portion 88 of the deflecting plates. Since the first portion of the deflecting plates is positioned above the engagement surfaces 56 and 58 of the track rollers 26, these surfaces are protected from this falling material.

In the case of gritty material, such as sand or the like, the material will be allowed to build up on the deflecting plates 80 and 82. The height of the second portion 90 of each deflecting plate is such that it will allow the material to build up to a point wherein the material will define an angled slope that extends between the upper extremity of the second portion, forwardly as viewed in 2, and the first portion 88. The angled slope also extends between the side of the respective arm 40 and 42 to which the deflecting plates are mounted and the second side portion 86 of the first portion 88 of the respective deflecting plates. When this occurs, the additional material that falls or is removed from the idler will be directed down the slope toward the relieved portion 64 defined be the roller 26. When directed to this area of the roller, the abrasive material is directed away from contact with the engagement surfaces 56 and 58.

By utilizing deflecting plates 80 and 82 as described above, any material carried by the track chain assembly 14 will be directed away from the engagement surfaces 56 and 58 of the rollers 26. By doing this, the material is prevented from being carried by those surfaces and thus being interposed between the engagement surfaces 56 and 58 and the wear rails 72 defined by the track links. The same is true with respect to the wear rails of the track links and the engagement surfaces 46 and 48 by the idler 18. With the absence of this material between these respective contact surfaces, the wear therebetween will not be accelerated as it typically would be. This will result in increased life of the entire track chain assembly. Increasing the life of the track chain components results in the reduction of the expense of replacement parts as well as eliminating downtime of the machine required to replace wear components.

Other aspects, objects and advantages of this invention can be obtained from a study of the drawings, the disclosure and the appended claims.

We claim:

1. A material deflector assembly for a track assembly, comprising:

a frame having a first end portion defining a pair of bifurcated arm members;

an idler member having a pair of engagement surfaces defined thereon in spaced relationship to one another and being mounted to the frame between the bifurcated arm members;

a roller member having a pair of engagement surfaces defined thereon in spaced relationship to one another and being mounted to the frame with the engagement surfaces thereof aligned with the engagement surfaces of the idler member; and a pair of deflecting plates having a first portion and a second portion positioned at an upwardly extending angle from the first portion, each of said deflecting plates being secured to opposing ones of the bifurcated arms in overlying relationship to the track roller with the second portion thereof adjacent the engagement surfaces of the idler member.

2. The material deflector assembly as set forth in claim 1 wherein the track assembly further includes a plurality of link members each of which defines a rail portion along a first surface thereof, each link member being pivotally connected to one another to form first and second continuous chain members that are spaced from each other a preselected distance sufficient for the rail portions defined by the link members of the respective chain members to contact the engagement surfaces defined by the roller and idler members.

3. The material deflector assembly as set forth in claim 1 wherein the frame is one of a pair of bogie arms pivotally mounted to a track frame, a first bogie arm having a first idler and being mounted on a first end portion of the track frame and a second bogie arm having a second idler and being mounted on a second end portion of the track frame and a plurality of track rollers mounted between the idlers with at least one of said rollers mounted to each of the bogie arms.

4. The material deflector assembly as set forth in claim 2 wherein each of the idler members define an upraised center portion that is positioned between the spaced apart engagement surfaces and the first and second continuous chain members.

5. The material deflector assembly as set forth in claim 1 wherein the engagement surfaces of the roller member are spaced from one another by a cylindrical portion having a diameter smaller than that of the engagement surfaces to define a relieved portion therebetween.

6. The material deflector assembly as set forth in claim 5 wherein one of the deflecting plates has a first side portion secured to one of the respective bifurcated members and a second side portion that overlies the relieved portion defined by the roller member while the other of the deflecting plates has a first side portion secured to the other of the respective bifurcated members and a second side portion that overlies the relieved portion defined by the roller member.

7. The material deflector assembly as set forth in claim 1 wherein the each one of the pair of deflecting plates has a first, substantially planar portion and a second, upwardly curved portion, said deflecting plates being secured to opposing ones of the bifurcated arms in substantially overlying relation to the respective engagement surfaces defined by the roller member, said curved end portion of each plate member being positioned adjacent the idler member.

8. A material deflector assembly for a track assembly comprising:

a frame adapted to support the track assembly, said frame having a first end portion defining a pair of bifurcated arms;

an idler member having a pair of spaced-apart engagement surfaces defined on opposing end portions thereof that are adapted for engagement with the track assembly and being rotatably mounted to the frame between the bifurcated arms;

a roller member having a pair of spaced apart engagement surfaces defined on opposing end portions thereof that are adapted for engagement with the track assembly and being rotatably mounted to the frame at a location that is subjacent and generally centrally positioned between and the bifurcated arm members; and a pair of deflecting plates having a first, substantially planar portion and a second, upwardly extending portion, each of said deflecting plates being secured to opposing ones of the bifurcated arms in substantially overlying relation to the engagement surfaces defined by the roller member, said upwardly extending portion of each deflecting plate being positioned adjacent the idler member.

9. The material deflector assembly as set forth in claim 8 wherein the track assembly includes a plurality of link members that define a rail portion along a first surface, each link member being pivotally connected to one another to form first and second continuous chain members that are spaced from one another a preselected distance.

10. The material deflector assembly as set forth in claim 9 wherein the idler member defines an upraised center portion that is positioned between the spaced apart engagement surfaces to space the engagement surfaces from one another a distance substantially equal to the preselected distance between the first and second chain members.

11. The material deflector assembly as set forth in claim 10 wherein the roller member includes a generally cylindrical relieved portion between the two engagement surfaces wherein the engagement surfaces are spaced apart a distance sufficient for alignment with the engagement surfaces of the idler member and the rail portions of the track chain.

12. The material deflector assembly as set forth in claim 11 wherein each of the deflecting plates defines a width that is substantially equal to the engagement surface defined by the track roller.

13. The material deflector assembly as set forth in claim 12 wherein one of the deflecting plates defines a first side portion that is secured to one of the bifurcated arms and a second side portion that overlies the relieved portion defined by the roller member and the other deflecting plate defines a first side portion that is secured to the other of the bifurcated arms and a second side portion that overlies the relieved portion defined by the roller member.

14. The material deflector assembly as set forth in claim 13 wherein the upwardly extending portion extends from the planar portion a direction that is approximately 90 degrees from the planar portion and is positioned adjacent the idler member to deflect any material falling from the idler member onto the first member.

15. The material deflector assembly as set forth in claim 14 wherein the height of the upwardly extending portion of each deflecting plate is equal to a distance that is approximately equivalent to two thirds of the width of the planar portion of the deflecting plates, said height being sufficient to permit material to build up on the planar portion and extend between the second side portion of each deflecting plane and the bifurcated arm adjacent the respective first side portions of each deflecting plate along an angle of approximately 45 degrees, wherein additional material directed onto the planar portion from the idler will be deflected over the second side of the deflecting plates and toward the recessed portion of the roller member.

* * * * *